United States Patent [19]
LeBlanc

[11] Patent Number: 5,120,336
[45] Date of Patent: Jun. 9, 1992

[54] FLOW CONSTRICTION DEVICE IN RADIATOR STEAM TRAP

[76] Inventor: Thomas F. LeBlanc, 156 Park St., Gardner, Mass. 01440

[21] Appl. No.: 782,907

[22] Filed: Oct. 24, 1991

Related U.S. Application Data

[63] Continuation of Ser. No. 352,925, May 17, 1989, abandoned, which is a continuation-in-part of Ser. No. 242,527, Sep. 12, 1988, abandoned.

[51] Int. Cl.⁵ .................... B01D 46/10; F15D 1/02
[52] U.S. Cl. ................................................ 55/466
[58] Field of Search .............. 138/40, 41, 44; 55/466, 55/502, 190, 199; 239/390, 590.5

[56] References Cited

U.S. PATENT DOCUMENTS

| | | | |
|---|---|---|---|
| 1,200,006 | 10/1916 | Meyers | 138/41 |
| 2,288,715 | 7/1942 | Kapper et al. | 138/41 |
| 2,393,423 | 1/1946 | Sekera | 138/41 |
| 2,631,659 | 3/1953 | Wright | 138/44 |
| 3,311,131 | 3/1967 | Zahuranec | 138/44 |
| 4,054,157 | 10/1977 | Moseley | 138/40 |
| 4,105,721 | 8/1978 | Schliebe | 138/44 |
| 4,171,209 | 10/1979 | Brown | 138/41 |
| 4,426,213 | 1/1984 | Stavroponlous | 138/41 |
| 4,745,943 | 5/1988 | Mortensen | 138/44 |

FOREIGN PATENT DOCUMENTS

| | | | |
|---|---|---|---|
| 814165 | 7/1951 | Fed. Rep. of Germany | 138/41 |
| 164805 | 6/1921 | United Kingdom | 138/41 |

*Primary Examiner*—James E. Bryant, III
*Attorney, Agent, or Firm*—Wolf, Greenfield & Sacks

[57] ABSTRACT

A constriction device for a steam trap of a radiator, which may replace prior art thermostatic elements and valves in the steam trap body. The device includes a nozzle body that replaces the valve, and a venturi-like constantly open passage extends through the body. The passage has a turbulence producing inlet and a turbulence reducing outlet and a connecting throat. A filter screen is carried by the nozzle body to prevent particles from being carried into the passage.

13 Claims, 5 Drawing Sheets

FLOW CONSTRICTION DEVICE IN RADIATOR STEAM TRAP

This application is a continuation of application Ser. No. 07/352,925, filed May 17, 1989, now abandoned which is a continuation-in-part of Ser. No. 07/242,527 filed Sep. 12, 1988, now abandoned.

INTRODUCTION

This invention is closely related to another device for removing condensate from a steam system and which is the subject of my application Ser. No. 07/242,527 filed Sep. 12, 1988 and entitled "FLOW CONSTRICTION DEVICE FOR THE REMOVAL OF CONDENSATE". The present application is a continuation-in-part of that application.

This invention relates to devices intended to remove condensed liquids from a piping system or equipment while preventing or minimizing the loss of gases or vapors from which they have condensed.

Such devices are widely employed in steam systems for a variety of reasons. These include preventing mechanical damage caused by the shock of water hammer, maintaining the efficiency of heat transfer equipment, reducing the corrosive damage to piping and equipment and maintaining a more efficient system by minimizing the loss of live steam before its heat value can be properly utilized.

The broad category of prior art devices includes those which cycle between open and closed to remove the intended liquids and those which are designed with a fixed opening to constantly bleed the system. This device replaces the thermostatic element and valve assembly in a balanced pressure thermostatic radiator steam trap which cycles open to remove condensate and cycles closed to retain steam within the equipment. This invention relates more closely to a group of fixed opening, constant bleed devices. However, conversion to the prior art devices within this group will require replacement of the entire radiator steam trap.

U.S. Pat. Nos. 3,715,870 and 3,877,895 describe devices utilizing a plate with a small diameter orifice drilled at its center. The office serves as a restricted flowpath through which condensate may be forced. The plate is inserted in a condensate return line between two flanges and sealed with gaskets. A screening device is incorporated into the gasket at the high pressure inlet side of the plate. These devices provide an efficient condensate bleed when properly sized to line conditions. They have the potential to develop leaks upon deterioration or improper installation of the gasket material. Flow patterns through them follow those of square edged orifices. These flow patterns cause edge erosion of the orifice plate and often cause particle build-up at the exit of the orifice plate, which can plug the orifice from the backside.

U.S. Pat. No. 4,171,209 describes an orifice plate formed within the body of a fitting which can be connected to standard pipe fittings in a condensate return line. This device incorporates a seated screening device spaced just upstream of the orifice plate formation. In its simplest form, it eliminates the sealing requirements between the orifice plate and flanges of the '870 and '895 patents, supra. In order to prevent the loss of live steam, the patent states "the apparatuses, according to the invention are best designed to have orifices of such size that most but not all of the condensate will be expelled therethrough so that at least some liquid remains within the system at the orifice to prevent loss of steam or other vapor or gas through the orifice." Flow patterns through these devices also follow those of square-edged orifices. The drawbacks to flow through these devices are the same as those mentioned above.

U.S. Pat. Nos. 4,426,213 and 4,486,208 describe flow, constriction devices for drainage of steam condensate which incorporate the flow characteristics of a tubular nozzle. The bodies of these devices are designed to receive tubular nozzle inserts in a variety of sizes. This design allows for easier and less costly fabrication of the nozzle structure. It also allows for interchanging nozzle structures within the same body when required to meet changes in system conditions, e.g. steam pressure.

SUMMARY OF THE INVENTION

This invention provides a reliable replacement device, with no moving parts, for the thermostatic element, valve and orifice of a balanced pressure thermostatic radiator steam trap. The function of either device is to remove condensate from radiators and fin tube convectors while holding back steam within the equipment until its heat valve is utilized. This device is a uniquely designed convergent/divergent nozzle and attached strainer piece that fits within an existing thermostatic radiator steam trap body in place of the thermostatic element, valve and orifice. The nozzle removes the condensate that is formed within the heating unit on a continuous basis while the screen protects the throat of the nozzle from plugging by sediments carried in the condensate. The design of the nozzle strainer assembly allows for simple adoption of this convergent/divergent flow technology into a steam heating system that uses balanced pressure thermostatic radiator steam traps without having to remove and replace the existing steam trap bodies.

BRIEF FIGURE DESCRIPTION

FIG. 4 is a cross-sectional view of a second embodiment of this invention designed to be threaded into an existing radiator steam trap body such as that of FIG. 2a.

DETAILED DESCRIPTION

Figure 1:
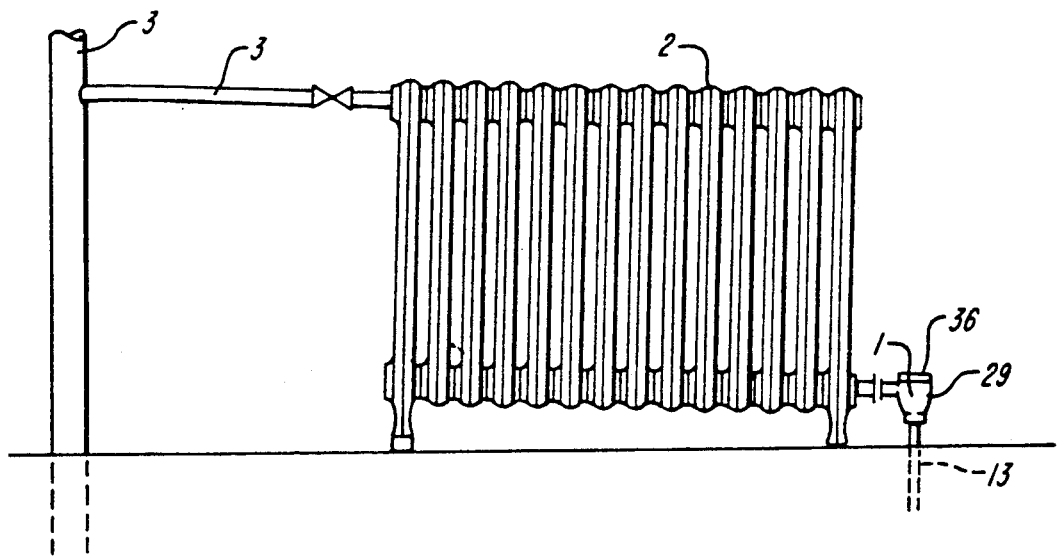
FIG. 1 is a side elevation of a typical installation of a thermostatic radiator steam trap

FIG. 1 shows a typical installation of a thermostatic radiator steam trap 1 at the base of a cast iron radiator 2. The steam supply 3 is piped into the top of the opposite end of the radiator 2. Steam fills the radiator 2 from the top down to the bottom. The steam continuously condenses inside the radiator 2 and the condensate drains to the bottom of the radiator 2 due to the force of gravity. The radiator 2 is pitched downwardly slightly towards the steam trap end in order to guide the steady stream of condensate towards the steam trap 1. The steam trap 1 has a thermostatic element inside which opens a valve when subcooled condensate is present in the steam trap body 29. This allows the condensate to flow freely out of the radiator. When steam, or a mixture of condensate and steam at saturation temperatures, enters the steam trap body 29, the thermostatic element closes the valve. Steam is trapped within the radiator 2 until its heat is given up and it condenses. When the trapped condensate subcools, the thermostatic element slowly opens the valve to allow the condensate to exit.

Figure 2A:
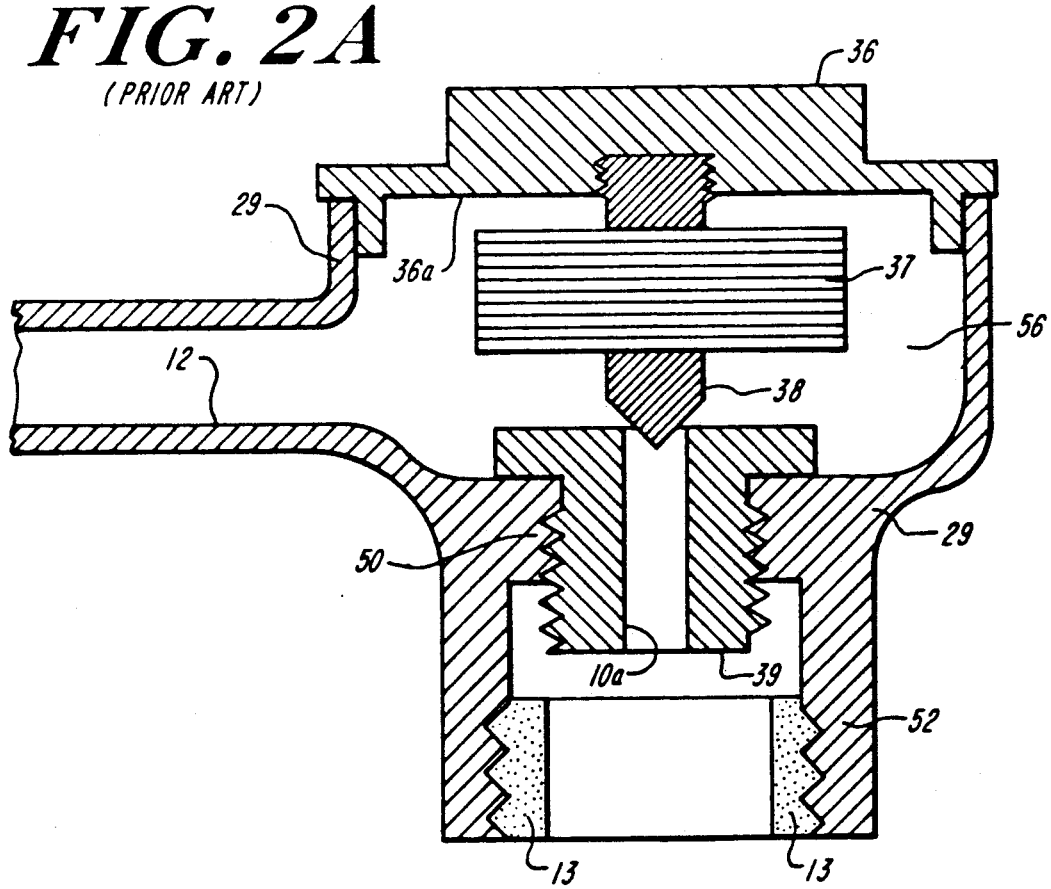
FIG. 2a is an enlarged cross-sectional view of the radiator steam trap body in the installation of FIG. 1 showing one style of prior art in which the thermostatic element and valve assembly and the orifice are installed by threading to the cap piece and steam trap body respectively.
Figure 2B:
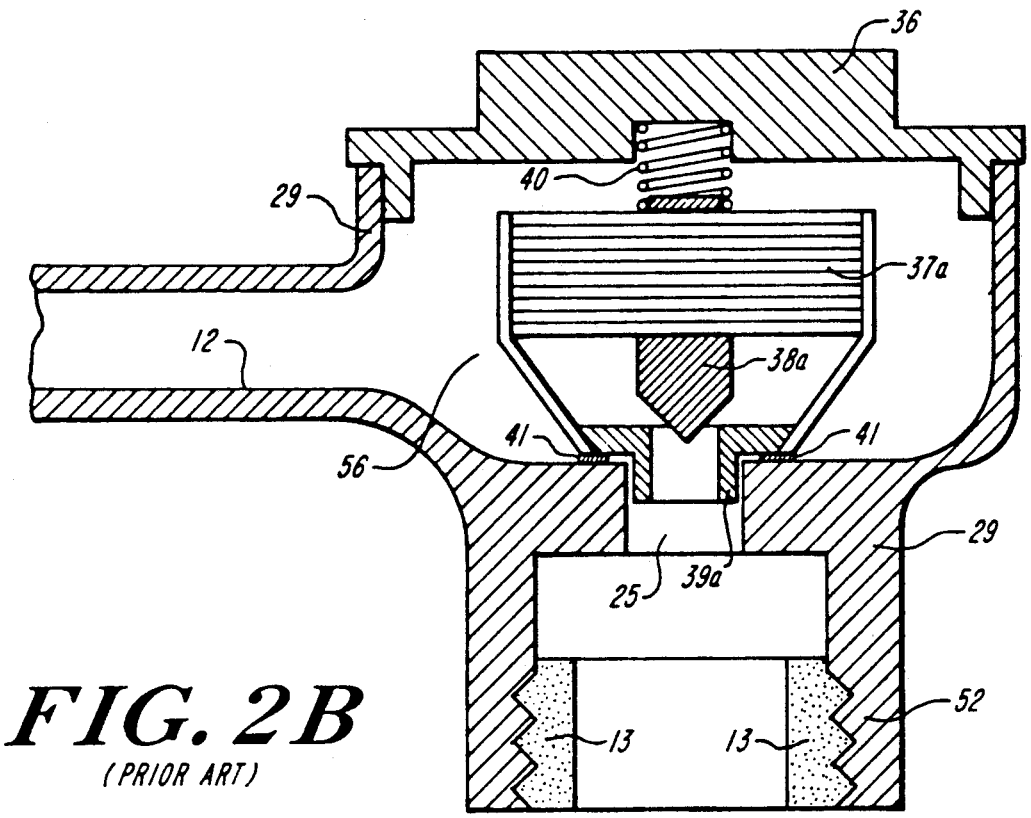
FIG. 2b is an enlarged cross-sectional view of the radiator trap body in the installation of FIG. 1 showing another style of prior art in which the thermostatic element, valve and orifice are included as one assembly, which is secured in place by a compression spring from the tightened steam trap cap.

The steam trap body 29 is shown in detail in FIGS. 2a and 2b. The body 29 includes an inlet duct 12 connected to the body above the valve seat 50, and an internally threaded outlet duct 52 connected to the body beneath the seat 50 is connected to the drain 13. A chamber 56 is provided in the body 29 above the seat 50, which receives the valve and thermostatic element, as described below.

Different embodiments of this invention are required to facilitate replacement of the thermostatic valve and orifice of different radiator steam traps. FIG. 2a shows a prior art design in which the thermostatic element 37 and valve 38 are included as one assembly which is secured to the cover piece 36 of the steam trap. A separate orifice member 39 having an orifice 10a is secured in the steam trap body 29 aligned with the thermostatic element and valve. FIG. 2b shows a second prior art design in which the thermostatic element 37a, valve 38a and orifice member 39a are included as a single assembly. This assembly is held in place by a compression spring 40 which is engaged as the cap 36 of the steam trap is tightened in place. This design incorporates a gasket 41 between the orifice member 39a and the steam trap body 29.

The thermostatic elements in the prior art designs operate under harsh conditions and will eventually fail with the valve either in the open or closed position. If it fails with the valve in the open position, not only condensate but steam as well will exit freely from the radiator. Because the steam trap orifice is oversized to quickly eliminate the condensate during the open cycle, substantially higher than normal heating costs result when a failed open condition occurs due to the lost steam before its heat value can be utilized. If the thermostatic element fails in the closed position, neither condensate nor steam can exit the radiator, and the radiator will become either waterlogged or airlocked. Under either condition the radiator will not give off heat.

Figure 3:
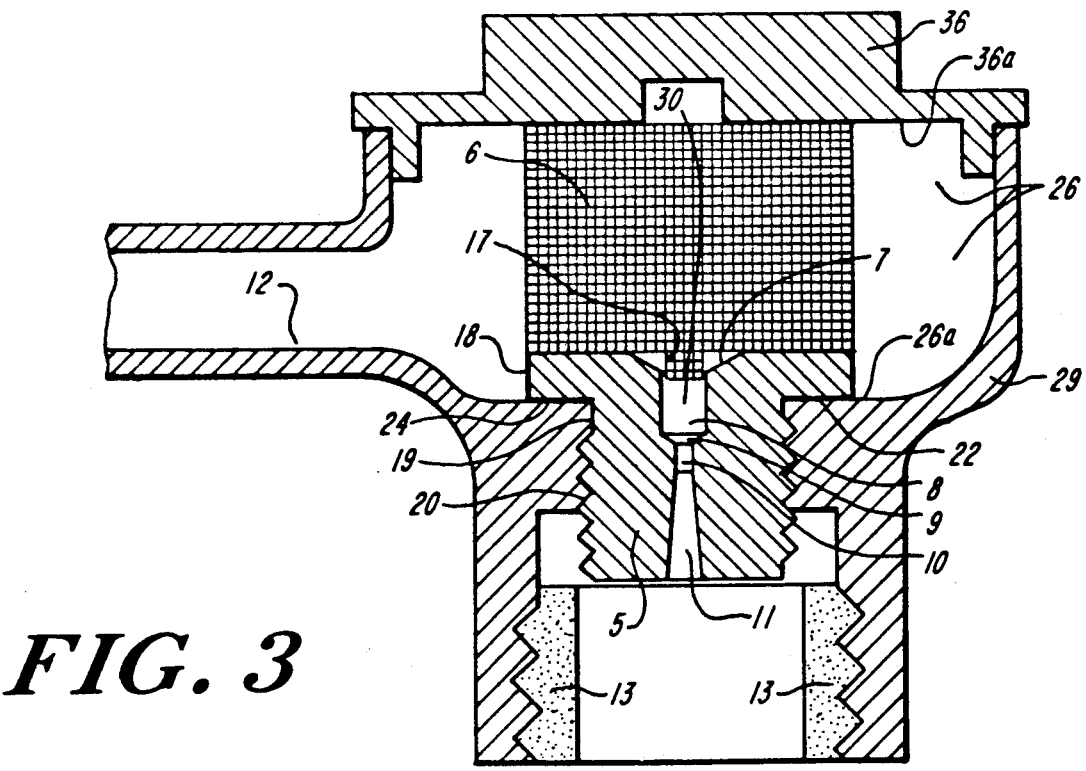
FIG. 3 is an enlarged cross-sectional view of the radiator steam trap body in the installation of FIG. 2a with the thermostatic element removed and one embodiment of this invention installed in its place.

FIG. 3 is a cross-sectional view of the radiator steam trap body 29 employed in the system of FIG. 2a with the conventional thermostatic element, valve and orifice removed and an embodiment of the flow constriction device of this invention in its place. This invention is a replacement option for the thermostatic element, valve and orifice of the prior art. It has no moving parts that can fail. The flow constriction of this invention includes a unique nozzle 5 with a flow channel 30 having convergent sections 7, 8 and 9, which funnel the condensate from the steam trap body 29, promote turbulence, and direct the condensate through the throat 10 of the nozzle and into a gradually tapered diverging section 11, designed to maximize the flow capacity of the nozzle 5. The replacement nozzle 5 is engineered to remove entirely the condensate formed in the heating equipment while preventing or minimizing the loss of live steam. The nozzle 5 removes the condensate continuously, and is provided with a very small diameter at throat 10 as compared to the orifice 10a (see FIG. 2a) which it replaces. Because of this small throat diameter, it is necessary to protect the throat from sediments carried by the condensate. The screen formation 6 serves that function. The screen element 6 fits tightly around the nozzle piece 5 and is sized for the dimensions of different steam trap bodies 29.

The nozzle flow channel, as shown in FIG. 3 is formed in a unique convergent/divergent manner. The nozzle flow channel design is the same in the different embodiments of this invention. This design incorporates a turbulence producing, funnel-like converging inlet stage 7, 8 and 9, a cylindrical throat 10 and a slightly tapered, turbulence reducing, diverging stage 11. The nozzle is disposed vertically within the steam trap body 29 with the converging inlet sections 7, 8 and 9 at the top.

The inlet to the nozzle flow channel 30 is formed with a steeply tapered frustoconical section 7 leading into a short cylindrical section 8. This cylindrical section in turn leads to another steeply tapered frustoconical section 9 which channels condensate and steam to the cylindrical throat 10 of the nozzle. The sections 7, 8 and 9 funnel the condensate to the throat 10 in a manner that promotes turbulence. The condensate flowing along the low point of the duct 12 from the radiator 2 to the steam trap body 29 cascades down the first frustoconical section 7 into the path of the faster moving steam which flows above and around the condensate towards the nozzle throat 10. Turbulence is created in the cylindrical section 8 as the condensate cascades into the path of the faster moving steam. The second frustoconical section 9 funnels the mixture of steam and condensate into the throat 10 of the nozzle. The mixture of condensate and steam entering the nozzle throat 10 is at the saturation temperature of the higher upstream pressure present in the radiator 2. This mixture flashes as it accelerates through the nozzle throat 10 due to a pressure drop through the nozzle throat. A choke flow condition is maintained through the throat 10. Maximum flow through the nozzle throat is promoted by minimizing the turbulence through the diffusion stage 11 of the channel 30. Minimum turbulence can be attained by a gradual tapering out of the diverging stage 11 to control the expansion of the condensate/steam mixture as it flashes to the lower downstream pressure. The outlet stage 11 leads from the nozzle throat 10 to the condensate return line 13. The dimensions of the nozzle channel sections 7, 8, 9, 10 and 11 are determined by the pressure differential across the nozzle 5 and by the amount of condensate which must be removed in accordance with well-known engineering principles. All of the nozzle flow channel sections 7, 8, 9, 10 and 11 are coaxial and are centrally located within the nozzle 5.

Figure 9:
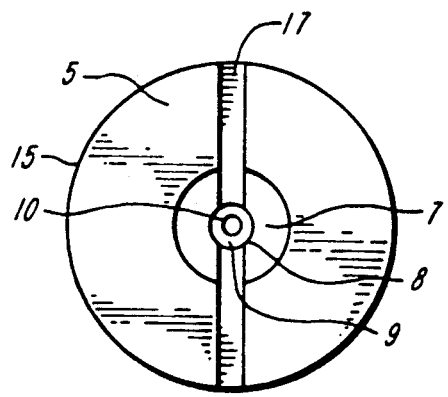
FIG. 9 is a top view of the nozzle piece used in the embodiment of FIG. 3.
Figure 10:
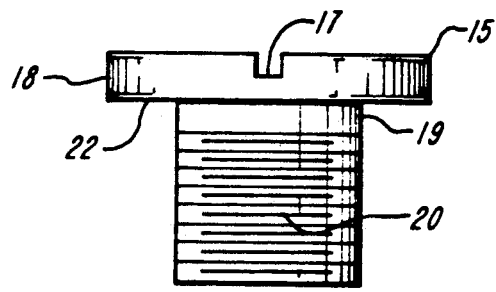
FIG. 10 is a side view of the nozzle piece of FIGS. 3 and 9.

The embodiment of this invention shown in FIGS. 3, 9 and 10 is a replacement for the thermostatic element, valve and orifice shown in FIG. 2a of the nozzle piece. The nozzle 5 is fabricated out of a piece of bar stock. The round perimeter of this embodiment is preferred for easier shaping and fitting of the screen device 6 around the nozzle 5. The channel 30, as described previously, is machined through the bar stock. The outer diameter 15 of the bar stock is left untouched from the entrance end of the nozzle to a width of about 3/16ths of an inch along the edge 18 to form a head for the nozzle. From this point, the bar stock is milled to a smaller diameter 19 for the cutting of threads 20 to match those of the orifice member 39 being removed. Proper thread cutting and sealing means are employed to ensure that condensate flows through the nozzle only. The thread sealing means may incorporated the use of gasket material between the nozzle shoulder 22 and the steam trap body 29, though this is not shown in either FIGS. 2a or 3. A slot 17 is milled across the head or inlet end of the nozzle to serve as a tool engagement surface for tightening the nozzle assembly in place. The screening device 6 is formed in a cylindrical shape to fit snuggly around the edge 18 of the nozzle head. The length of the screen 6 is equal to the distance between the lower surface 26a of the high pressure side 26 of the steam trap body 29 and the inside surface 36a of the cover 36 in the closed position. The screen 6 may be spot-welded to the outer edge 18 of the nozzle 5 and may be fabricated out of wire mesh or perforated metal and should have a pore size of no greater than approximately 0.034". The screen 6 may be open at the top as the upper edge engages the lower surface 36a of the cap 36 so that access to the inside of the screen is not available through the top. If the screen top does not bear against the cap, the screen preferably is closed at the top either by additional screening or an imperforate member.

Figure 4:
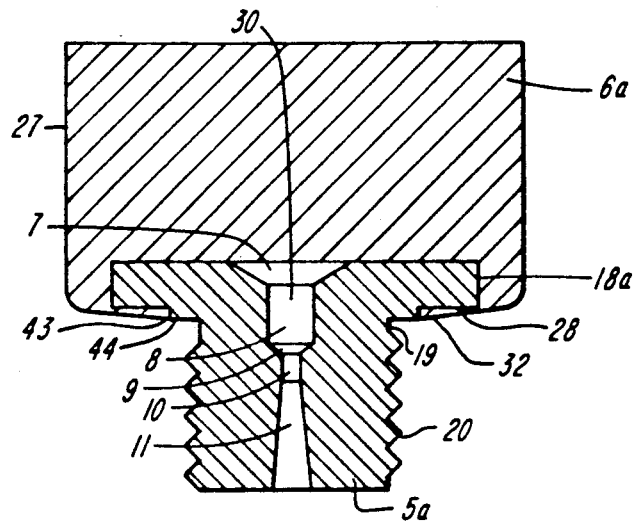
Figure 7:
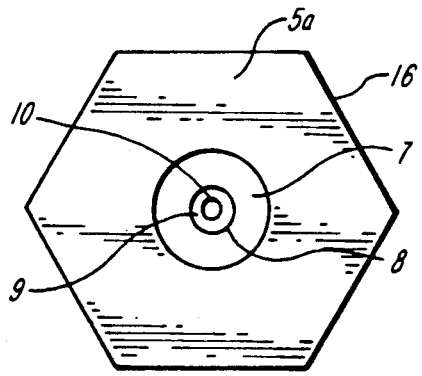
FIG. 7 is a top view of the nozzle piece used in the embodiment of FIG. 4.
Figure 8:
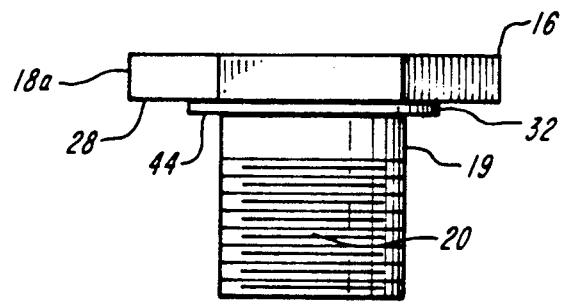
FIG. 8 is a side view of the nozzle piece of FIGS. 4 and 7.

Another embodiment of this invention is shown in FIGS. 4, 7 and 8. This embodiment is another replacement for the thermostatic element, valve and orifice found in FIG. 2a. It is similar to the embodiment of the device shown in FIG. 3 except for the following. In this embodiment, the nozzle 5a is fabricated out of hexagonal bar stock. The outer perimeter 16 of the bar stock is maintained to a depth of about 5/32nds of an inch from the inlet end to form the head 18a. A cylindrical step 32 larger than that of the threaded body 19 is cut just under the hexagonal head 18a to a depth of about 1/32nd of an inch. The bottom 28 of the head 18a radially beyond the surface of the step 32 functions as a seat for the screen 6a. the screen 6a is fabricated from perforated screen stock and is pan shaped at the bottom. A central opening 43 is punched out of the screen to fit tightly around the cylindrical step 32. The step 32 formed beneath the head 18a and the undercut of the threads on the body 19 are punched over the screen 6a to hold it in place. A socket wrench is engaged over the hexagonal outer perimeter of the head 18a of the nozzle 5a in order to secure the device within a steam trap.

Figure 5:
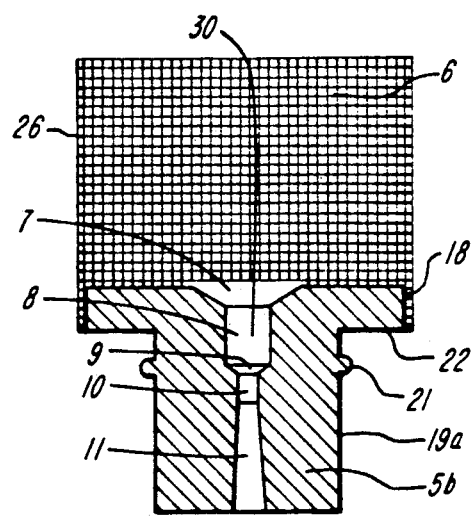
FIG. 5 is a cross-sectional view of a third embodiment of this invention designed to be press-fit into an existing radiator steam trap body such as that of FIG. 2b.
Figure 11:
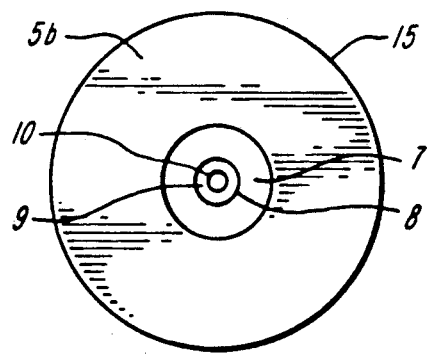
FIG. 11 is a top view of the nozzle piece used in the embodiment of FIG. 5.
Figure 12:
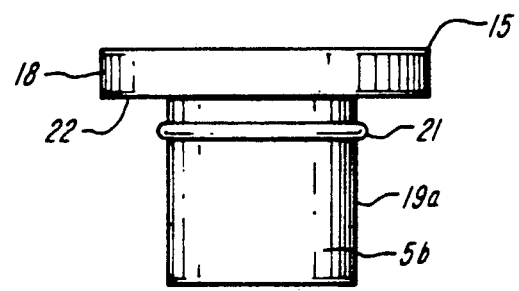
FIG. 12 is a side view of the nozzle piece of FIGS. 5 and 11.

Another embodiment of this device is shown in FIGS. 5, 11 and 12. This embodiment is intended as a replacement of the one piece thermostatic element, valve and orifice shown in FIG. 2b. This embodiment is similar to that of FIG. 3 except as follows: The thread formation 20 of FIG. 3 is replaced with the oversized bead 21 which is dimensioned to allow a snug press fit of the nozzle 5b into the passage 25 in the steam trap body. The diameter of the cylindrical body 19a on either side of the bead 21 is slightly smaller than that of the passage 25. The tool engagement slot 17 shown in FIGS. 9 and 10 is eliminated. Gasket material may be used between the nozzle shoulder 22 and the steam trap body 29 when sealing requirements so dictate.

Figure 6:
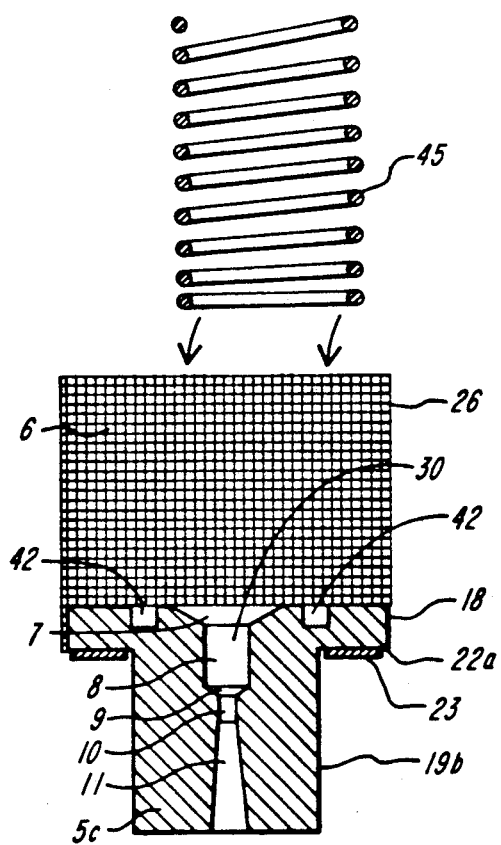
FIG. 6 is a cross-sectional view of a fourth embodiment of this invention designed to be installed into an existing radiator steam trap body such as that of FIG. 2b.
Figure 13:
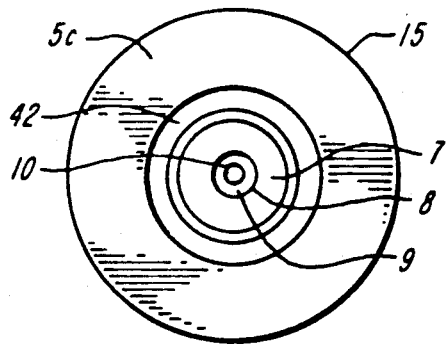
FIG. 13 is a top view of the nozzle piece used in the embodiment of FIG. 6.
Figure 14:
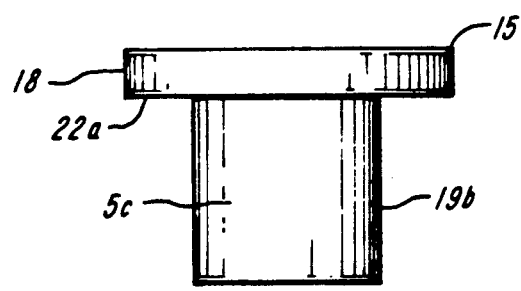
FIG. 14 is a side view of the nozzle piece of FIGS. 6 and 13.

Another embodiment of this device is shown in FIGS. 6, 13 and 14. This embodiment is also a replacement for the type of element found in FIG. 2b. It is similar to the embodiment of the device shown in FIG. 5 except as follows: The bead 21 is removed leaving the entire length of the cylindrical body 19b slightly smaller in diameter than the passage 25 in the steam trap body into which it fits. A circular channel 42 is cut into the inlet end of the nozzle 5c. This channel 42 serves as a seat for compression spring 45 which fits between the nozzle 5c and the steam trap cap 36 and holds the device within the closed steam trap body 29. A gasket 23 is provided between the shoulder 22a of the nozzle and the steam trap body 29 in this embodiment of the invention.

While the steam traps in the drawings are opened from the top and the thermostatic elements are mounted vertically, it should be appreciated that certain traps in the prior art open from the side and the thermostatic elements are mounted at an angle of 45°. The constriction devices of this invention may be used in such traps and may be oriented in other than a true vertical position. It should also be appreciated that certain modifications may be made of this invention without departing from its spirit. Therefore, the scope of this invention is not to be limited to those embodiments illustrated and described. Rather, its scope is to be determined by the appended claims and their equivalents.

What is claimed is:

1. In a thermostatic radiator steam trap having a hollow, cylindrical steam trap body with a first end and a second end, a radial steam inlet, a cover fitting over and closing the first steam trap body end and an axial condensate outlet extending from the second steam trap body end, apparatus for replacing an existing thermostatic element, valve and a valve seat mounted in the condensate outlet, the apparatus comprising:

a cylindrical nozzle body having a top and a diameter and an exterior shape which fits into the condensate outlet in place of the existing valve seat so that the nozzle body top is positioned below said steam inlet when the nozzle body is inserted into a condensate outlet;

means for mounting the nozzle body in the condensate outlet;

a venturi passage formed coaxially in the nozzle body and extending therethrough, the passage having an inlet having a first diameter, means connecting the inlet with a cylindrical throat having a second diameter less than said first diameter, having a third diameter greater than said second diameter, and means connecting the throat to the outlet so that said passage acts as a venturi passage; and a filter screen replacing the existing thermostatic element and valve for preventing particles from being carried into the passage, the filter screen having an annular transverse cross-section, extending from the cover to the nozzle body, being located coaxially within the steam trap body and having a diameter larger than the nozzle body diameter so that the filter screen completely surrounds the nozzle body and steam entering the steam trap body through the steam inlet passes radially through the filter screen and enters the venturi passage inlet.

2. In a thermostatic radiator steam trap, apparatus according to claim 1 wherein the nozzle body exterior is threaded and the nozzle body mounting means allows the nozzle body to be screwed into the condensate outlet.

3. In a thermostatic radiator steam trap, apparatus according to claim 2 wherein the nozzle body mounting means is a tool-engaging slot in said nozzle body.

4. In a thermostatic radiator steam trap, apparatus according to claim 2 wherein the nozzle body mounting means is a tool-engaging head mounted on said nozzle body.

5. In a thermostatic radiator steam trap, apparatus according to claim 1 wherein the nozzle body exterior is slightly larger than the condensate outlet and the nozzle body mounting means allows the nozzle body to be force fit into the condensate outlet.

6. In a thermostatic radiator steam trap, apparatus according to claim 1 wherein the nozzle body comprises a gasket and the nozzle body mounting means presses the gasket against the condensate outlet.

7. A radiator steam trap comprising:

a hollow, cylindrical steam trap body with a first end and a second end, a radial steam inlet, a cover fitting over and closing the first steam trap body end and an axial condensate outlet extending from the second steam trap body end;

a cylindrical nozzle body having a top and a diameter and a exterior shaped to fit into the condensate outlet so that the nozzle body top is positioned below said steam inlet when the nozzle body is inserted into the condensate outlet;

means for mounting the nozzle body coaxially within the condensate outlet;

a venturi passage formed coaxially in the nozzle body and extending therethrough, the passage having an inlet having a first diameter, means connecting the inlet with a cylindrical throat having a second diameter less than said first diameter, an outlet having a third diameter greater than said second diameter, and means connecting the throat to the outlet so that said passage acts as a venturi passage; and a filter screen for preventing particles from being carried into the passage, the filter screen having an annular transverse cross-section, extending from the cover to the nozzle body, being located coaxially within the steam trap body and having a diameter larger than the nozzle body diameter so that the filter screen completely surrounds the nozzle body and steam entering the steam trap body through the steam inlet passes radially through the filter screen and enters the venturi passage inlet.

8. A radiator steam trap according to claim 7 wherein the nozzle body exterior is threaded and the nozzle body mounting means allows the nozzle body to be screwed into the condensate outlet.

9. A radiator steam trap according to claim 8 wherein the nozzle body mounting means is a tool-engaging slot in said nozzle body.

10. A radiator steam trap according to claim 8 wherein the nozzle body mounting means is a tool-engaging polygonal head mounted on said nozzle body.

11. A radiator steam trap according to claim 7 wherein the nozzle body exterior is slightly larger than the condensate outlet and the nozzle body mounting means allows the nozzle body to be force fit into the condensate outlet.

12. A radiator steam trap according to claim 7 wherein the nozzle body comprises a gasket and the nozzle body mounting means presses the gasket against the condensate outlet.

13. A radiator steam trap according to claim 7 wherein the nozzle body mounting means is a compression spring.

* * * * *